US008718366B2

(12) United States Patent
Wredenhagen (10) Patent No.: US 8,718,366 B2
(45) Date of Patent: May 6, 2014

(54) MOVING TEXT DETECTION IN VIDEO (75) Inventor: Gordon F. Wredenhagen, Toronto (CA)

(73) Assignee: ATI Technologies ULC, Markham, Ontario (CA)

(*) Notice: Subject to any disclaimer, the term of this patent is extended or adjusted under 35 U.S.C. 154(b) by 700 days.

(21) Appl. No.: 12/416,347

(22) Filed: Apr. 1, 2009

(65) Prior Publication Data
US 2010/0254605 A1 Oct. 7, 2010

(51) Int. Cl.
*G06K 9/34* (2006.01)

(52) U.S. Cl.
USPC ........... 382/176; 382/104; 382/105; 382/199; 348/571; 348/452; 348/468

(58) Field of Classification Search
USPC ......... 382/176, 104, 107, 159, 161, 198, 218, 382/229, 105, 199, 228, 173, 69, 170, 171, 382/205, 260, 177, 202; 340/905, 910, 936, 340/146.2, 305; 348/571, E05.062, 468, 348/263, 447, 451, 452, 462, 450, 524, 663, 348/668, 669, E5.1, 449, 208.1, 700, 701, 348/445, 550, 607, 97; 358/3.13, 462, 1.9
See application file for complete search history.

(56) References Cited

U.S. PATENT DOCUMENTS

| | | | |
|---|---|---|---|
| 5,058,182 A * | 10/1991 | Kuan et al. | 382/202 |
| 5,642,442 A | 6/1997 | Morton et al. | |
| 6,501,856 B2 * | 12/2002 | Kuwano et al. | 382/194 |
| 6,674,906 B1 | 1/2004 | Han et al. | |
| 6,754,369 B1 * | 6/2004 | Sazawa | 382/105 |
| 6,778,700 B2 | 8/2004 | Karidi et al. | |
| 6,842,537 B2 * | 1/2005 | Nicolas et al. | 382/199 |
| 7,043,080 B1 | 5/2006 | Dolan | |
| 7,177,472 B2 | 2/2007 | Karidi et al. | |
| 7,446,817 B2 * | 11/2008 | Jung et al. | 348/468 |
| 8,023,041 B2 * | 9/2011 | Jia et al. | 348/452 |
| 8,149,913 B2 * | 4/2012 | Ishii | 375/240.16 |
| 8,300,958 B2 * | 10/2012 | Zhou | 382/232 |
| 2006/0280250 A1 * | 12/2006 | Ishii | 375/240.16 |
| 2009/0016618 A1 * | 1/2009 | Zhou | 382/232 |
| 2009/0161988 A1 | 6/2009 | Wredenhagen | |

OTHER PUBLICATIONS iecheng Liu and Chekuri Choudary; "Content Extraction and Summarization of Instructional Videos",pp. 149-152, IEEE 2006.*
Tiecheng Liu and Chekuri Choudary, "Content Extraction and Summarization of Instructional Videos", IEEE Transactions on Multimedia, pp. 1-13.*
Tiecheng Liu and Chekuri Choudary; "Content Extraction and Summarization of Instructional Videos",pp. 149-152, IEEE 2006.*
Tiecheng Liu and Chekuri Choudary, "Content Extraction and Summarization of Instructional Videos", IEEE I Transactions on Multimedia, pp. 1-13,2006.*

(Continued)

*Primary Examiner* — Mekonen Bekele
(74) *Attorney, Agent, or Firm* — Volpe and Koenig, P.C.

(57) ABSTRACT

Methods and apparatus for detecting moving text in video comprising receiving consecutive frames from a video stream, extracting a sequence of pixels from the consecutive frames, categorizing the pixels, thinning the pixels, correlating corresponding thinned pixels in the frames, identifying the peaks that are equal to or exceed a threshold, and performing further processing on the peaks to determine if the peaks contain moving text.

18 Claims, 5 Drawing Sheets

(56) References Cited

OTHER PUBLICATIONS

Mainak Biswas, Truong Nguyen "A Novel Motion Estimation Algorithm Using Phase Plane Correlation for Frame Rate Conversion", IEEEE 2002 pp. 492-496.*

Tiecheng Liu and Chekuri Choudary, "Content Extraction and Summarization of Instructional Videos", IEEE Transactions on Multimedia, pp. 1-13, IEEE Transactions on Multimedia, vol. 9, No. 7, Nov. 2007.*

* cited by examiner

MOVING TEXT DETECTION IN VIDEO

FIELD OF INVENTION

This application is related to image processing.

BACKGROUND

Moving text in video creates a variety of problems for subsequent video processing. An increasing number of videos feature both text and graphics. For example, a news broadcast may include a picture with a caption, and a sports broadcast may have a streaming ticker indicating up-to-date scores along with actual game footage. When video images containing moving text require further processing, such as frame rate conversion (FRC), the text can become distorted or worse.

Frame rate conversion (FRC) may be used to improve the quality of a video. For example, FRC may be used to create a smoother picture by reducing blurred motion, film judder and other defects. Frame rate conversion is also commonly used in video compression and video format conversion. However, if FRC is used to process video that contains moving text, the FRC function must have a way to accurately identify the moving text. This is because moving text is often processed differently than graphics but in order to accomplish this alternative processing, the text must first be identified in the image as a distinct entity. Current moving text identification techniques do not provide a precise determination of moving text within a video stream.

Thus, a more precise method of detecting moving text in video is highly desirable.

SUMMARY

Methods and apparatus for detecting moving text in video comprising receiving consecutive frames from a video stream, extracting a sequence of pixels from the consecutive frames, categorizing the pixels, thinning the pixels, correlating corresponding thinned pixels in the frames, identifying the peaks that are equal to or exceed a threshold, and performing further processing on the peaks to determine if the peaks contain moving text.

BRIEF DESCRIPTION OF THE DRAWINGS

A more detailed understanding may be had from the following description, given by way of example in conjunction with the accompanying drawings wherein.

DETAILED DESCRIPTION

A video stream is comprised of frames (images). These frames are comprised of rows of pixels. A pixel refers to a specific location (set of coordinates) in a two-dimension (2D) frame. A pixel may have certain characteristics such as color (red(R), green(G) and blue(B)) (RGB), chrominance and luminance. These characteristics, individually or in combination, are referred to as pixel values, and may be used to analyze the frames of a video image.

A pixel value (e.g., luminance) may be used to facilitate the identification of edges of moving text in a frame. The edges may be identified by analyzing the transition of pixel values of respective pixels in a given row. Any pixel row that contains text will have several transitions of high contrast. If consecutive rows exhibit this high contrast characteristic, those rows are assumed to contain text.

Figure 1:
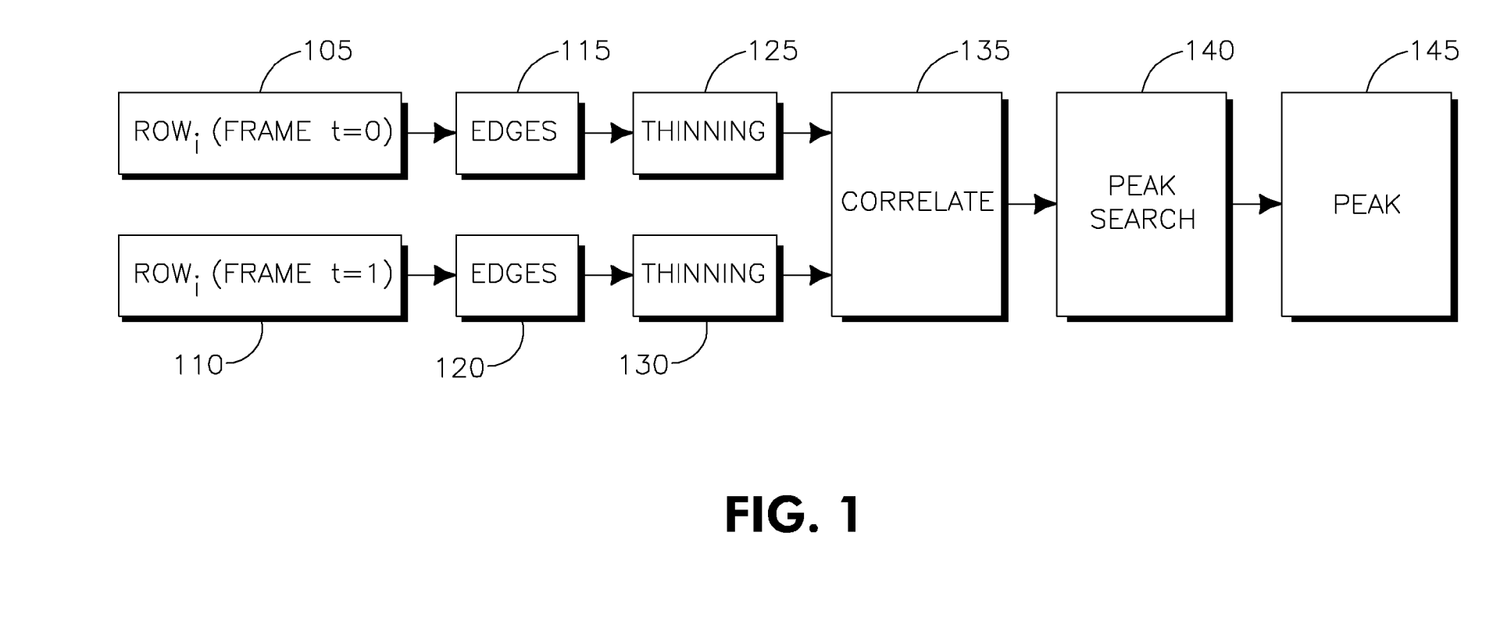
FIG. 1 is a flow diagram of an example method for detecting moving text in a video stream.

FIG. 1 is a flow diagram of one example embodiment for detecting moving text in the frames of a video stream. Consecutive frames, a first frame 105 at time(t)=0 and a second frame 110 at t=1, are obtained (received, scanned, extracted, etc.) from a video stream.

In this embodiment, the detection of moving text is accomplished by extracting pixel values from the pixels in every row in consecutive frames (a first frame and a second frame). After the pixel values in a given row have been extracted, the pixels may be categorized as UP, LEVEL, or DOWN. This categorization is accomplished as explained in the following discussion.

Starting at the beginning of a row, two consecutive pixels are extracted along with their respective pixel values. The first pixel value is subtracted from the second pixel value. The result of this subtraction may be compared to one or more thresholds. Based upon this comparison, the first pixel is categorized as UP, LEVEL, or DOWN. These categorized pixels of consecutive frames 105 and 110 may be referred to as edges 115 and 120.

The categorized pixels are thinned 125 and 130 thereby reducing the amount of pixels required for a subsequent correlation operation. The pixels from first frame 105 are correlated 135 (using, e.g., phase plane correlation) against the corresponding pixels in second frame 110 (e.g., the first pixel in row 1 of the first frame is correlated with the first pixel in row 1 of the second frame and so on). Correlation results in a correlation surface in which peaks and their respective amplitudes are a direct indication of the similarity in luminance, i.e., pixel value, between the consecutive frames, and thus, these peaks may identify the moving text. The correlation surface is analyzed to search for peaks 140 (determine the peaks). The peaks are compared to a threshold 145 and those peaks that are equal to or greater than the threshold are probable candidates for containing moving text.

Although the method of FIG. 1 and the methods below are described in terms of analyzing rows, these methods function equally when described in terms of columns.

Figure 2A:
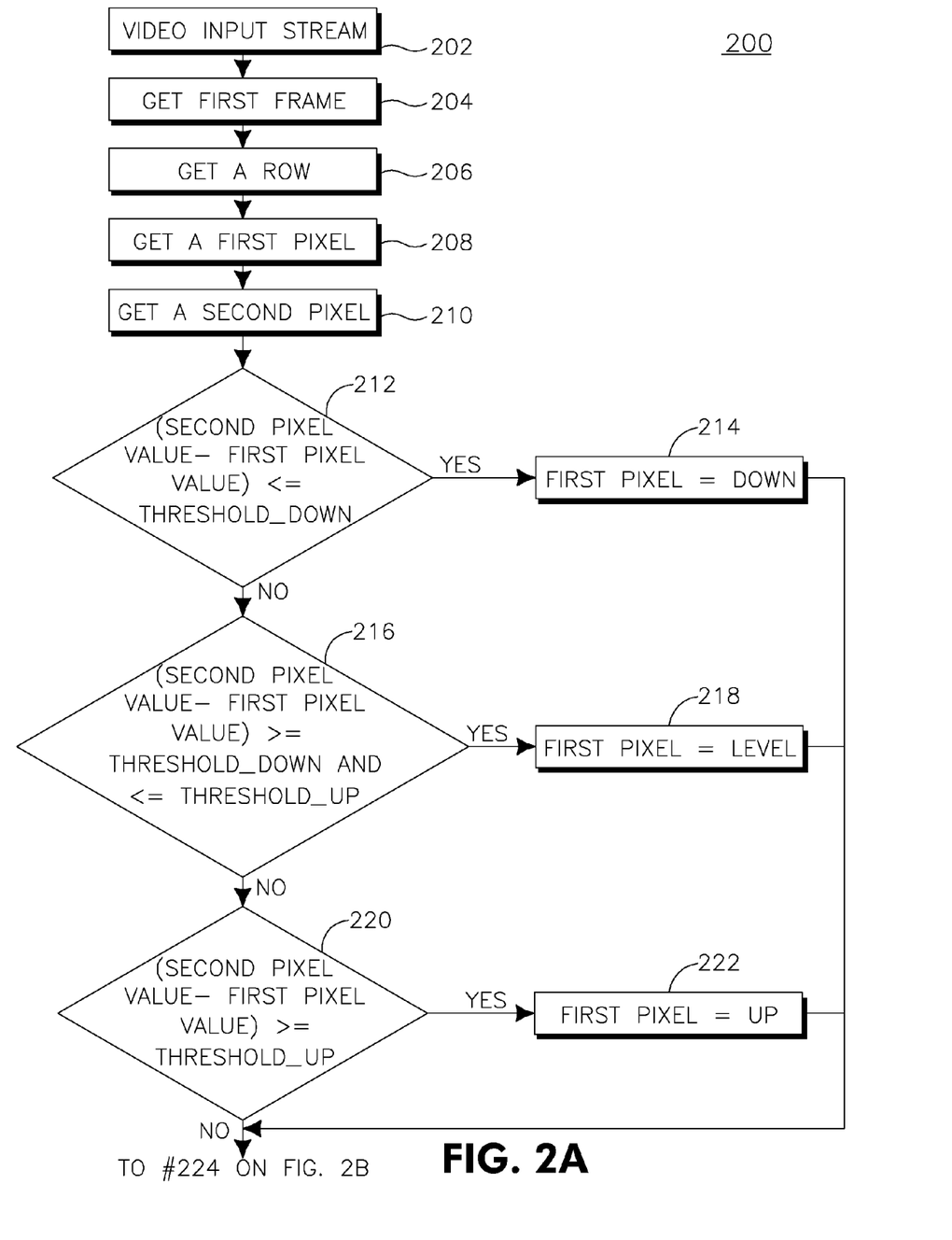
FIG. 2A-2C is a flow diagram of an alternative example method for detecting moving text in a video stream.
Figure 2B:
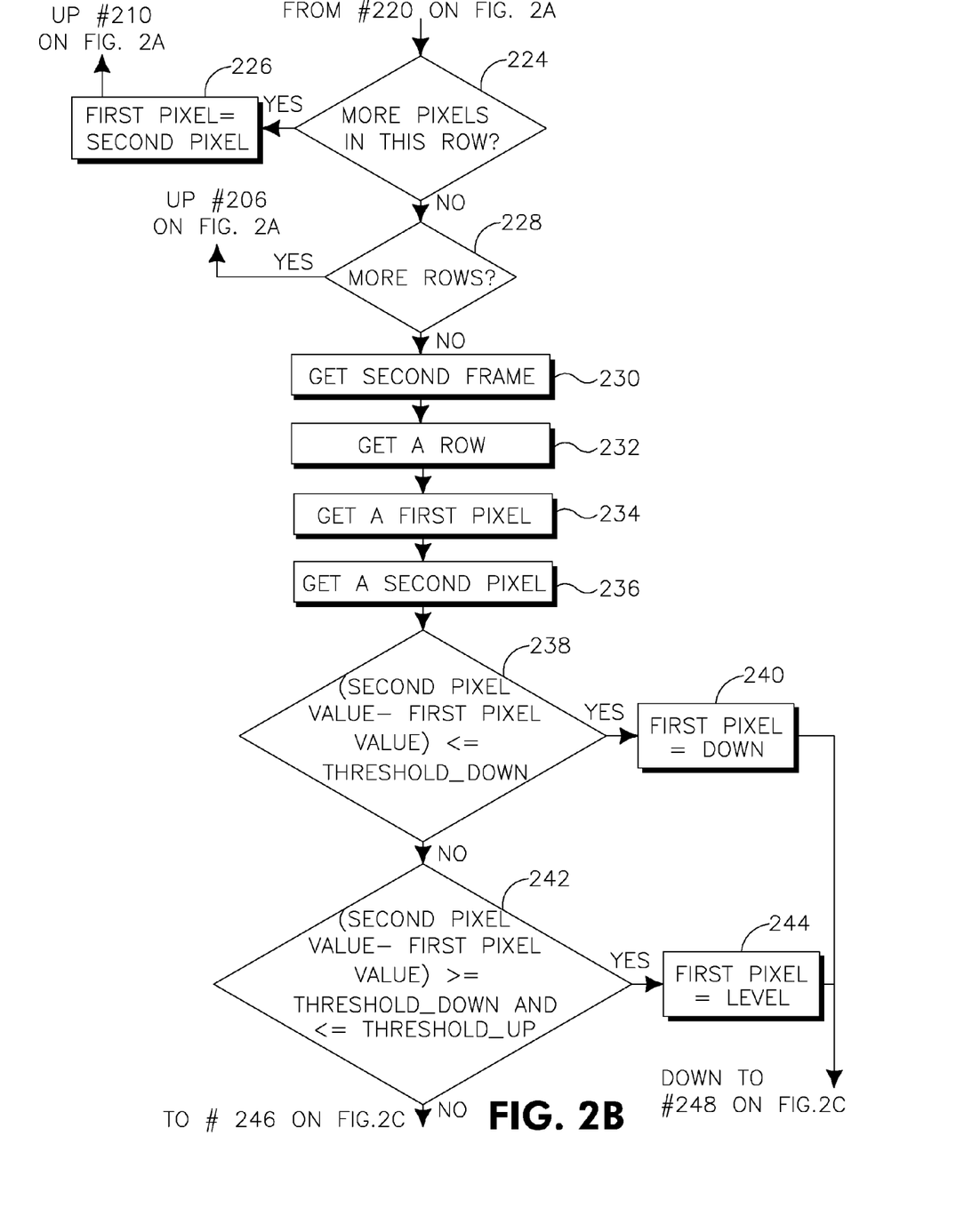
Figure 2C:
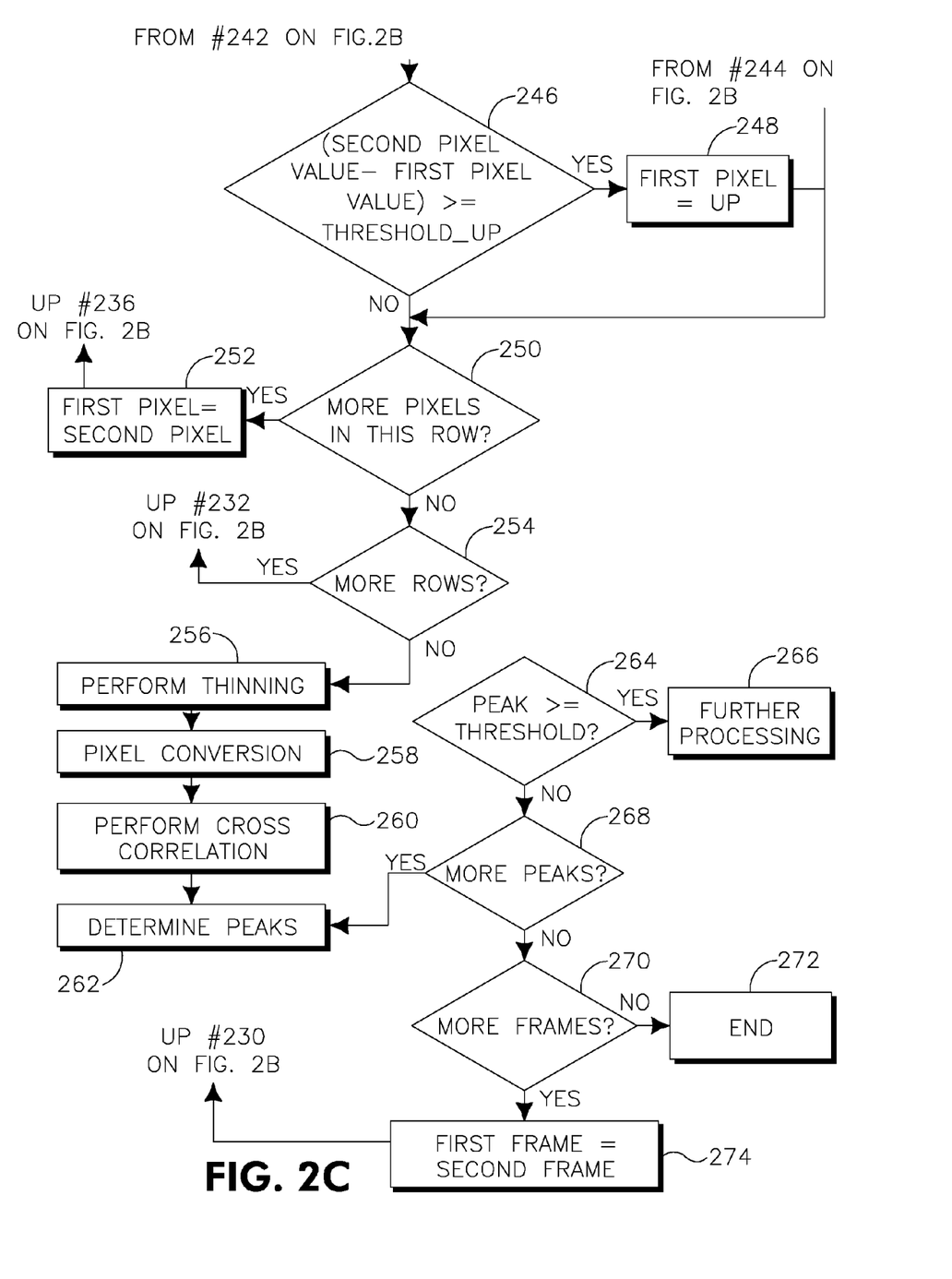

FIG. 2A-2C is a flow diagram of another example embodiment for detecting moving text in a video stream. An input video stream is received (scanned, extracted, etc.) 202. A first frame at t=0 is extracted from the video stream 204 (this part of the method may operate in parallel to the extraction of a second frame described below). A row of pixels is extracted 206 from the first frame. A first pixel value is extracted from the first pixel in the row 208, and a second pixel value is extracted from the second pixel in the same row 210. These consecutive pixel values in the row are subtracted (the first pixel is subtracted from the second pixel) and the result may be used to detect transitions or edges, and thus potential moving text.

The result of the subtraction may be compared to one or more predefined thresholds and the first pixel may be labeled (categorized). A threshold value may be configurable by a user, by a manufacturer, etc., or the threshold may be programmable or may be based upon the results of processing.

The method shown in FIG. 2A-2C utilizes two thresholds: one indicating an up transition (threshold_up), and a second threshold indicating a down transition (threshold_down). The first pixel is categorized (labeled) as follows:

the first pixel is categorized as DOWN 212 whenever a second pixel value minus the first pixel value is less than or equal to threshold_down 214;

the first pixel is categorized as LEVEL 216 whenever the second pixel value minus the first pixel value is greater than threshold_down and less than threshold_up 218;

the first pixel is categorized as UP 220 whenever the second pixel value minus the first pixel value is greater than or equal to threshold_up 222.

After a pixel has been categorized, a check is made to determine if there are more pixels in the current row 224. If there are more pixels in the current row, the first and second pixels are swapped, that is the second pixel along with its respective pixel value becomes the "new" first pixel 226, and the next consecutive pixel becomes the "new" second pixel. Thus, in the next (subsequent) iteration, the pixel value of the second pixel will be subtracted from the pixel value of the third pixel and the second pixel will be categorized as described above (subsequently, the third pixel value will be subtracted from the fourth pixel value and so on as the method iterates). This process continues until all the remaining pixels in the current row are categorized. If all of the pixels in the current row have been categorized, a check is made to determine if there are more rows 228. If there are more rows, the categorization process continues as described above until each pixel in each row of the first frame has been categorized.

A second frame is extracted from the video stream 230 (this part of the method may operate in parallel to the extraction of the first frame described above). A row of pixels is extracted 232 from the second frame. A first pixel value is extracted from the first pixel in the row 234. A second pixel value is extracted from the second pixel in the same row 236. The consecutive pixel values in the row are subtracted (the first pixel is subtracted from the second pixel) and the result may be used to detect transitions or edges as potential moving text.

The result of the subtraction may be compared to one or more predefined thresholds and the first pixel may be labeled (categorized). A threshold value may be configurable by a user, by a manufacturer, or the threshold may be programmable or may be based upon the results of processing.

The first pixel is categorized as described above. The first pixel may be categorized as DOWN 238 whenever a second pixel value minus the first pixel value is less than or equal to threshold_down 240;

the first pixel may be categorized as LEVEL 242 whenever the second pixel value minus the first pixel value is greater than threshold_down and less than threshold_up 244;

the first pixel may be categorized as UP 246 whenever the second pixel value minus the first pixel value is greater than or equal to threshold_up 248.

After the first pixel has been categorized, a check is made to determine if there are more pixels in the current row 250. If there are more pixels in the current row, the first and second pixels are swapped, that is the second pixel along with its respective pixel value becomes the "new" first pixel 252, the next consecutive pixel becomes the "new" second pixel Thus, in the next (subsequent) iteration, the pixel value of the second pixel will be subtracted from the pixel value of the third pixel and the second pixel will be categorized as described above (subsequently, the third pixel value will be subtracted from the fourth pixel value and the third pixel will be categorized, and so on as the method iterates). This continues until all the remaining pixels in the current row are categorized. If all of the pixels in the current row have been categorized, a check is made to determine if there are more rows 254. If there are more rows, the categorization process continues as described above until each pixel in each row of the second frame has been categorized.

Thinning 256 is performed on the categorized pixels in the first frame and the second frame in order to determine the first instance of a succession of similarly categorized pixels. This reduces the number of pixels that will be correlated during the correlation process. Depending on the frame, there may be many consecutive UP, DOWN or LEVEL transitions in a given row. An example of the thinning process is as follows:

the first instance of a succession of similarly labeled pixels is located, where D=DOWN, U=UP, and L=LEVEL;

if the categorized pixel values in a given row are, for example, LLLLUUUULLLLDDDD, thinning may reduce the row, such that only the position of the bracketing pixels remains, e.g., L---LU----UL----LD----D;

thinning 256 is performed on each categorized pixel in the corresponding rows in each consecutive frame.

Each pixel is converted to a pulse signal value 258, based upon its respective label, in order to facilitate correlation. For example, an UP pixel may be converted to a pulse signal value of +1, a LEVEL pixel may be converted to a pulse signal value of 0, and a DOWN pixel may be converted to a pulse signal value of −1. The actual pulse signal values are configurable by a user, by a manufacturer, or the pulse signal value may be programmable or based upon the results of processing.

The thinned and converted pixels of consecutive frames are then cross correlated (by corresponding pixel location, e.g., pixel 0 in row 0 of a first frame is correlated with pixel 0, row 0 of a second frame) using their respective pulse signal values, for example, using a correlation technique such as phase plane correlation (PPC), to determine whether regular structures, such as moving text, exist in the frames 260.

PPC results in a correlation surface in which the peaks in the correlation surface and their respective amplitudes are a direct indication of the similarity in image luminance. Further, there is a normalization step in the PPC technique that attenuates dissimilarities in luminance resulting in a normalized correlation surface that is far more discerning than simple correlation. The equation for generating the PPC surface is as follows:

$$PPC(I_1, I_2) = F^{-1}\left(\frac{F(I_1) \cdot F(I_2)*}{|F(I_1) \times F(I_2)*|}\right) \quad \text{(Equation 1)}$$

where F is the Fourier transform, $I_1$ and $I_2$ are the two images to be correlated (these typically come from the two consecutive images from either a row or a column), and $F^{-1}$ is the inverse Fourier transform. The peaks in the phase plane correlation surface are between zero and one. The size of the peak and its location are direct indications of the strength of the correlation and the displacement between the data. Peak extraction techniques are widely known and will not be described in detail hereafter.

The PPC may also take the image structure into account during the correlation process, so that pixels with similar luminance that belong to the similar structures are given more weighting than if they belonged to different structures. This procedure can be performed, for example, using a structured PPC as described in U.S. patent application Ser. No. 11/962,394 which is incorporated by reference herein.

Peaks in the frames are determined at 262. The peaks may be determined by making row over row comparisons in the same frame and/or consecutive frames. Each comparison may be subject to a threshold. The strength of a peak is compared against one or more predefined thresholds 264 which may be configurable by a user, by a manufacturer, or the threshold may be programmable or based upon the results of processing. If the peak is equal to or exceeds a predefined threshold and occurs across multiple rows, the peak is identified as a likely candidate containing moving text, and further processing 266 is performed on the peak is to determine if it actually contains moving text. If the peak is not equal to or does not exceed a predefined threshold, a check is made to determine if there are more peaks to process (evaluate) 268. If not, a check is made to determine if there are more frames to process 270. If so, then first frame and second frame are swapped 274, facilitating the comparison of subsequent frames: the second frame becomes the "new" first frame and there is no need to reprocess the new first frame or categorize the pixels because this has already been accomplished during the previous iteration of the method. Thus, in the next (subsequent) iteration, the second frame will be correlated with the third frame (subsequently, the third frame will be correlated with the fourth frame and so on as the method iterates). The maximum number of frames processed may be configured by a user, by a manufacturer, etc., or it may be programmable or based upon the results of processing. If there are no more frames 270, then processing ends 272.

Figure 3:
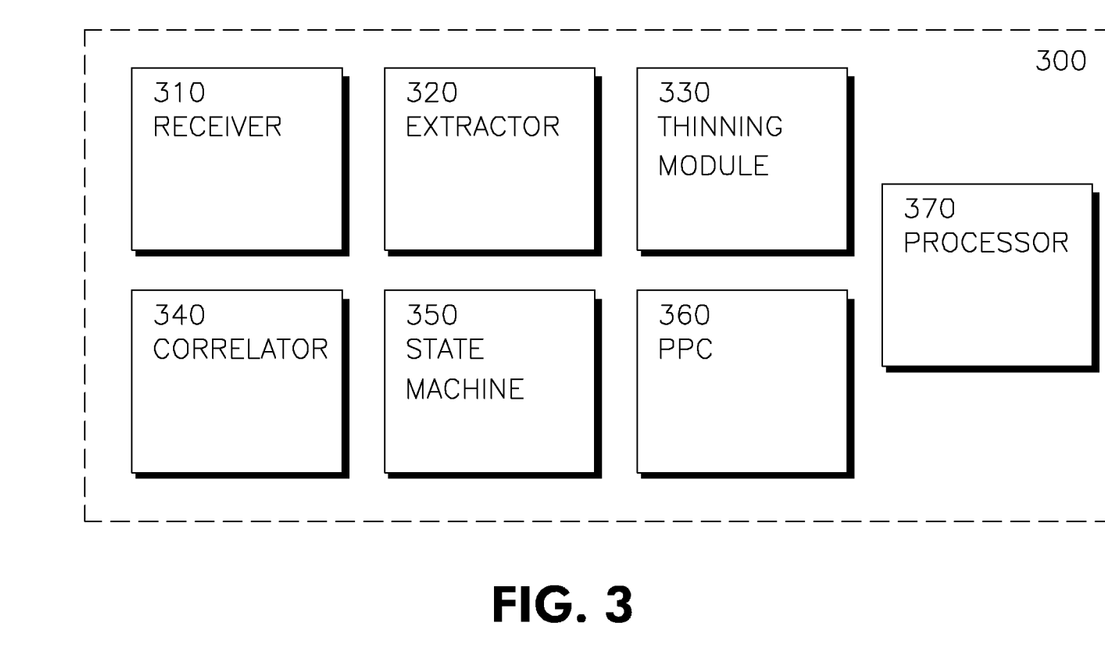
FIG. 3 is an example of a moving text detection device.

FIG. 3 is a block diagram of an example detection device 300 configured to perform moving text detection in video. The detection device comprises a receiver 310 that may be configured to receive a video stream; an extractor 320 that may be configured to extract frames, rows of pixels, pixels, or pixel values; a thinning module 330 configured to reduce the amount of pixel information to be correlated; a processor 370 configured to perform any processing required by the detection function such as pixel categorization, pixel conversion, peak identification or further processing of identified peak candidates to determine if they contain moving text; and a correlator 360 (e.g., a PPC) configured to perform correlation. The detection device 300 may optionally include a state machine 350 that is configured to perform any of the detection functions such as thinning or extracting.

Although features and elements are described above in particular combinations, each feature or element can be used alone without the other features and elements or in various combinations with or without other features and elements. Some or all of the features and elements may operate in parallel to other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

What is claimed is:

1. A method for detecting moving text in video comprising:
   extracting consecutive frames from a video stream;
   extracting rows of pixels from the consecutive frames;
   extracting pixel values from the pixels; and
   identifying peak candidates derived from the pixels that equal or exceed a threshold.

2. The method of claim 1 further comprising:
   categorizing the pixels based on the extracted pixel values;
   thinning the categorized pixels;
   converting thinned categorized pixels; and
   cross correlating corresponding thinned pixels from consecutive frames.

3. The method of claim 2 wherein the cross correlating is a phase plane correlation.

4. The method of claim 2 wherein the categorizing comprises:
   subtracting a first pixel value from a second pixel value and obtaining a result; and
   comparing the result to at least one threshold.

5. The method of claim 2 wherein thinning comprises determining a first instance of similarly categorized pixels.

6. A moving text detection device comprising:
   an extractor configured to extract from consecutive frames in a video stream rows of pixels;
   wherein consecutive frames occur in the video stream following one after the other in continuous sequence; and
   a processor configured to categorize pixels;
   a thinning module configured to thin the categorized pixels; and
   a correlator configured to perform correlation of the thinned pixels.

7. The moving text detection device of claim 6 further comprising:
   a receiver configured to receive a video stream.

8. The moving text detection device of 6 further comprising:
   a state machine configured to perform thinning or extraction.

9. The moving text detection device of 6 wherein the correlator is a phase plane correlator.

10. A moving text detection device comprising:
    an extractor configured to extract consecutive frames from a video stream;
    wherein consecutive frames occur in the video stream following one after the other in continuous sequence;
    the extractor further configured to extract rows of pixels from the consecutive frames;
    the extractor further configured to extract pixel values from the pixels; and
    a processor configured to identify peak candidates from pixels that equal or exceed a threshold.

11. The moving text detection device of claim 10 further comprising:
    the processor further configured to categorize the pixels based on the extracted pixel values;
    a thinning module configured to thin the categorized pixels;
    the processor further configured to convert the thinned categorized pixels; and
    a correlator configured to cross correlate corresponding thinned pixels from consecutive frames.

12. The moving text detection device of 11 wherein the correlator is a phase plane correlator.

13. The moving text detection device of 10 wherein the processor is further configured to:
    subtract a first pixel value from a second pixel value and obtaining a result; and
    comparing the result to at least one threshold.

14. The moving text detection device of 11 wherein the thinning module is further configured to determine a first instance of similarly categorized pixels.

15. A non-transitory computer readable storage medium comprising:
- a first set of instructions adapted to provide a processor, wherein the processor is configured to implement a second set of instructions, the second set of instructions comprising:
- an extraction code segment for extracting at least one row of pixels from consecutive frames;
- wherein consecutive frames follow one after the other in continuous sequence in the video stream; and
- an identification code segment for identifying peak candidates derived from pixels that equal or exceed a threshold.

16. The non-transitory computer readable storage medium of claim 15 wherein the second set of instructions further comprises:
- a receiving code segment for receiving consecutive frames from a video stream.

17. The non-transitory computer readable storage medium of claim 15 wherein the second set of instructions further comprises:
- a categorization code segment for categorizing the pixels;
- a thinning code segment for thinning the categorized pixels; and
- a correlation code segment for correlating corresponding thinned pixels in the frames.

18. The non-transitory computer readable medium of claim 15 wherein the first set of instructions or the second set of instructions are hardware description language (HDL) instructions.

\* \* \* \* \*